(12) United States Patent
Sugisono

(10) Patent No.: US 11,632,319 B2
(45) Date of Patent: Apr. 18, 2023

(54) PROCESSING DEVICE AND MOVING METHOD

(71) Applicant: Nippon Telegraph and Telephone Corporation, Tokyo (JP)

(72) Inventor: Koji Sugisono, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/424,676

(22) PCT Filed: Jan. 17, 2020

(86) PCT No.: PCT/JP2020/001452
§ 371 (c)(1),
(2) Date: Jul. 21, 2021

(87) PCT Pub. No.: WO2020/158444
PCT Pub. Date: Aug. 6, 2020

(65) Prior Publication Data
US 2022/0109619 A1   Apr. 7, 2022

(30) Foreign Application Priority Data
Feb. 1, 2019   (JP) .............................. JP2019-017483

(51) Int. Cl.
*H04L 43/0894*   (2022.01)
*H04L 47/28*   (2022.01)
(52) U.S. Cl.
CPC .......... *H04L 43/0894* (2013.01); *H04L 47/28* (2013.01)

(58) Field of Classification Search
CPC ............................ H04L 43/0894; H04L 47/28
See application file for complete search history.

(56) References Cited

U.S. PATENT DOCUMENTS

| | | | |
|---|---|---|---|
| 6,810,031 B1* | 10/2004 | Hegde ................. | H04L 49/3081 370/351 |
| 8,151,019 B1* | 4/2012 | Le ....................... | H04L 47/2441 710/52 |
| 9,081,599 B2* | 7/2015 | Tsirkin ..................... | G06F 9/455 |
| 9,928,107 B1* | 3/2018 | Vincent ................. | G06F 9/5077 |
| 2003/0189934 A1* | 10/2003 | Jeffries ................ | H04L 47/805 370/468 |

(Continued)

OTHER PUBLICATIONS

Clark et al., "Live Migration of Virtual Machines," Proceedings of the 2nd Conference on Symposium on Networked Systems Design and Implementation, May 2, 2005, pp. 273-286.

(Continued)

*Primary Examiner* — Jerry B Dennison
(74) *Attorney, Agent, or Firm* — Fish & Richardson P.C.

(57) ABSTRACT

A processing apparatus (10) processes received input data and outputs output data that is to be transferred to a synchronization target apparatus using a predetermined bandwidth. The processing apparatus (10) measures the generation rate of the output data that is to be output by the processing unit (122). Based on the measurement result, the processing apparatus (10) controls the input of input data such that a condition set in advance for the corresponding type of input data is satisfied and the generation rate of the output data rate is below the transmission rate of the band.

14 Claims, 12 Drawing Sheets

(56) References Cited

U.S. PATENT DOCUMENTS

| | | | | |
|---|---|---|---|---|
| 2008/0222375 A1* | 9/2008 | Kotsovinos | G06F 9/5083 | 709/230 |
| 2009/0323532 A1* | 12/2009 | Lai | H04L 47/26 | 370/235 |
| 2011/0276699 A1* | 11/2011 | Pedersen | H04L 47/24 | 709/227 |
| 2011/0286332 A1* | 11/2011 | Mizukoshi | H04L 45/38 | 370/235 |
| 2012/0230190 A1* | 9/2012 | Suzuki | H04L 1/0003 | 370/236 |
| 2013/0077486 A1* | 3/2013 | Keith | H04L 47/2433 | 370/230.1 |
| 2013/0083658 A1* | 4/2013 | Vasseur | H04W 28/021 | 370/230.1 |
| 2013/0286825 A1* | 10/2013 | Sherlock | H04L 47/562 | 370/230 |
| 2013/0305242 A1* | 11/2013 | Wang | G06F 9/45558 | 718/1 |
| 2014/0064077 A1* | 3/2014 | Chorafakis | H04B 17/336 | 370/230.1 |
| 2014/0359607 A1* | 12/2014 | Tsirkin | G06F 9/4856 | 718/1 |
| 2015/0016247 A1* | 1/2015 | Hayes | H04L 47/127 | 370/230 |
| 2015/0326658 A1* | 11/2015 | Mitsunobu | G06F 9/4856 | 718/1 |
| 2016/0188378 A1* | 6/2016 | Chao | G06F 9/5088 | 718/105 |
| 2016/0261510 A1* | 9/2016 | Burnette | H04L 47/29 | |
| 2017/0017512 A1* | 1/2017 | Csatari | G06F 9/4856 | |
| 2017/0272515 A1* | 9/2017 | Sanderson | H04L 67/1097 | |
| 2018/0024854 A1* | 1/2018 | Wang | G06F 12/1027 | 718/1 |
| 2018/0159780 A1* | 6/2018 | Essigmann | H04L 47/263 | |
| 2018/0246751 A1* | 8/2018 | Dong | G06F 9/45558 | |
| 2019/0129738 A1* | 5/2019 | Ekbote | H04L 41/046 | |
| 2019/0158371 A1* | 5/2019 | Dillon | H04L 47/196 | |
| 2019/0236150 A1* | 8/2019 | Zaslavsky | G06F 16/2308 | |
| 2019/0260685 A1* | 8/2019 | Tsirkin | H04L 41/5009 | |
| 2019/0265995 A1* | 8/2019 | Franciosi | G06F 9/45558 | |
| 2019/0286476 A1* | 9/2019 | Franciosi | G06F 9/4856 | |
| 2019/0294462 A1* | 9/2019 | Franciosi | G06F 9/45533 | |
| 2020/0159556 A1* | 5/2020 | Chandrappa | G06F 9/54 | |
| 2021/0406050 A1* | 12/2021 | Huang | G06F 9/4856 | |
| 2022/0156106 A1* | 5/2022 | Zhang | G06F 12/10 | |

OTHER PUBLICATIONS

Zhang et al., "A Survey on Virtual Machine Migration: Challenges, Techniques, and Open Issues," IEEE Communications Surveys and Tutorials, 2018, 20(2):1212-1218.

* cited by examiner

Fig. 4

| TRANSMISSION SOURCE IP ADDRESS | TRANSMISSION SOURCE PORT | ... | DESTINATION IP ADDRESS | DESTINATION PORT | ... | PRIORITY LEVEL | DROP RATE | TRANSMISSION BAND | ... |
|---|---|---|---|---|---|---|---|---|---|
| 192.0.2.11 | 8080 | | 192.0.2.21 | | | HIGH | | | |
| 192.0.2.12 | | | 192.0.2.22 | 443 | | MEDIUM | 0.4 | 2 | |
| | | | | | | LOW | | 1 | |
| 192.0.2.13 | | | 192.0.2.24 | | | HIGH | | | |
| ... | | | ... | | | | ... | | |

PROCESSING DEVICE AND MOVING METHOD

CROSS-REFERENCE TO RELATED APPLICATIONS

This application is a National Stage application under 35 U.S.C. § 371 of International Application No. PCT/JP2020/001452, having an International Filing Date of Jan. 17, 2020, which claims priority to Japanese Application Serial No. 2019-017483, filed on Feb. 1, 2019. The disclosure of the prior application is considered part of the disclosure of this application, and is incorporated in its entirety into this application.

TECHNICAL FIELD

The present invention relates to a processing apparatus and a migration method.

BACKGROUND ART

Network function virtualization technology has become prevalent in recent years. In network function virtualization technology, packet processing is performed using a network function implemented in a virtual machine. In a system that has such a virtualized function, it is possible to migrate a running function to another server and continue to perform packet processing.

When migrating a function to another server while continuing processing, in order to prevent the virtual machine from crashing after migration, the virtual machines need to be synchronized at the binary level in the pre-migration and post-migration servers. However, the virtual machine constantly updates data during packet processing. For this reason, in order to achieve complete synchronization, the continuously updated data also needs to be synchronized.

Here, data is updated by the virtual machine at a fast speed, and once data targeted for synchronization has been transferred using network band, data that is different from the transmitted data has already been recorded due to a data update. Accordingly, in order to achieve complete synchronization, it is necessary to stop the virtual machine and prevent data from being updated. Packets processed by the stopped virtual machine are dropped until virtual machine synchronization ends and packet processing resumes, thus resulting in packet loss while the virtual machine is stopped.

In view of this, in order to suppress packet loss, technology has been proposed for lowering the amount of data transferred while the virtual machine is stopped if the generation rate of the majority of generated synchronization target data is lower than the transmission rate of the network band used for synchronization (e.g., see NPL 1).

CITATION LIST

Non Patent Literature

[NPL 1] C. Clark, "Live Migration of Virtual Machines," Proceedings of the 2nd Conference on Symposium on Networked Systems Design & Implementation, 2005.

SUMMARY OF THE INVENTION

Technical Problem

However, conventional technology has a problem in that a service is greatly affected by packet loss. Here, the data update frequency that accompanies packet processing tends to increase proportionally with the number of packets. Also, in current network technology, it is often the case that there is insufficient network bandwidth for synchronization, and complete synchronization cannot be performed. In this case, in conventional technology, the virtual machine needs to be stopped when migration starts. Packet loss thus occurs while the virtual machine is stopped.

For example, in the case of an application that requires real-time performance, such as a gaming or video conferencing application, a long packet loss duration is perceived by the user as an operation command mistake or a degradation in image/voice quality. For this reason, stopping a virtual machine when service migration starts has a negative effect on a service that uses an application that requires real-time performance.

Means for Solving the Problem

In order to solve the foregoing problems and achieve an object of the present invention, a processing apparatus includes: a processing unit configured to process input data that was input, and output output data that is to be transferred to a synchronization target apparatus using a predetermined band; a measurement unit configured to measure a generation rate of the output data that is to be output by the processing unit; and an input control unit configured to, based on a measurement result obtained by the measurement unit, control input of the input data to the processing unit such that a condition set in advance for a corresponding type of input data is satisfied and the generation rate of the output data is below a transmission rate of the band.

Effects of the Invention

According to the present invention, it is possible to mitigate the negative effect on a service caused by packet loss.

BRIEF DESCRIPTION OF DRAWINGS

FIG. 4 is a diagram showing an example of a flow management table.

DESCRIPTION OF EMBODIMENTS

Hereinafter, embodiments of a processing apparatus and a migration method according to the present invention will be described in detail with reference to the drawings. Note that the present invention is not intended to be limited by the embodiments described below.

Configuration of First Embodiment

Figure 1:
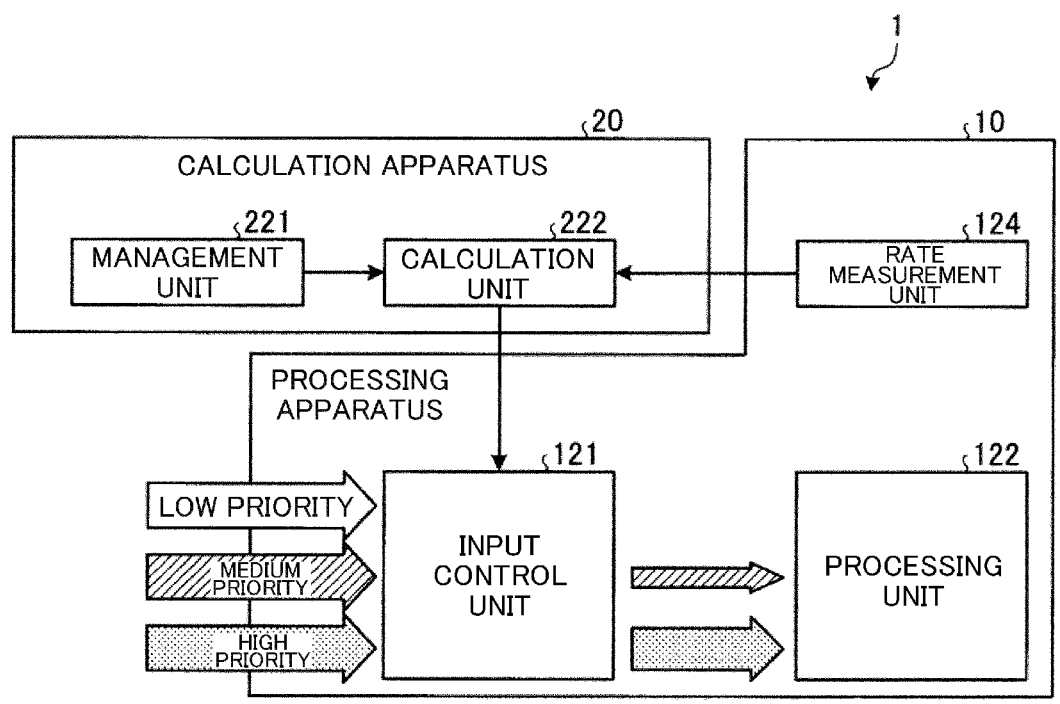
FIG. 1 is a diagram showing an example of the configuration of a software migration system according to a first embodiment.

First, the configuration of the software migration system will be described with reference to FIG. 1. As shown in FIG. 1, a software migration system 1 includes a processing apparatus 10 and a calculation apparatus 20. The processing apparatus 10 includes an input control unit 121, a processing unit 122, and a rate measurement unit 124. The calculation apparatus 20 includes a management unit 221 and a calculation unit 222. Note that details of the aforementioned units will be described later along with the configurations of the aforementioned apparatuses.

Here, the processing apparatus 10 executes an application for providing a service. Examples of the service include gaming, video conferencing, a web site, and text message delivery. The processing apparatus 10 receives various types of data, processes the input data, and outputs output data.

The software migration system 1 is a system for migrating the functions of the processing apparatus 10 to another apparatus. Output data continues to be output by the processing unit 122 even while data is being transferred from the processing apparatus 10 to the synchronization target apparatus for migration. For this reason, the output of data by the processing unit 122 needs to be controlled while data is being transferred.

In view of this, the input control unit 121 controls the output of output data by the processing unit 122 by controlling the input of input data to the processing unit 122. However, depending on the type of output data, there are cases where it is not desirable to place a limit on the output of output data by the processing unit 122. For example, whenever possible, it is desirable to not place a limit on the output of output data that is related to a service that requires real-time performance, such as a gaming or video conferencing service. On the other hand, somewhat of a limit is thought to be allowed in the case of the output of output data that is related to a service that does not require real-time performance, such as file transferring or email delivery. In view of this, the input control unit 121 can change how control is performed according to the type of data.

For example, in the example in FIG. 1, the input control unit 121 inputs high-priority data to the processing unit 122 as-is, inputs middle-priority data to the processing unit 122 with a limitation such as partial discarding or a timing delay, and discards low-priority data.

Figure 2:
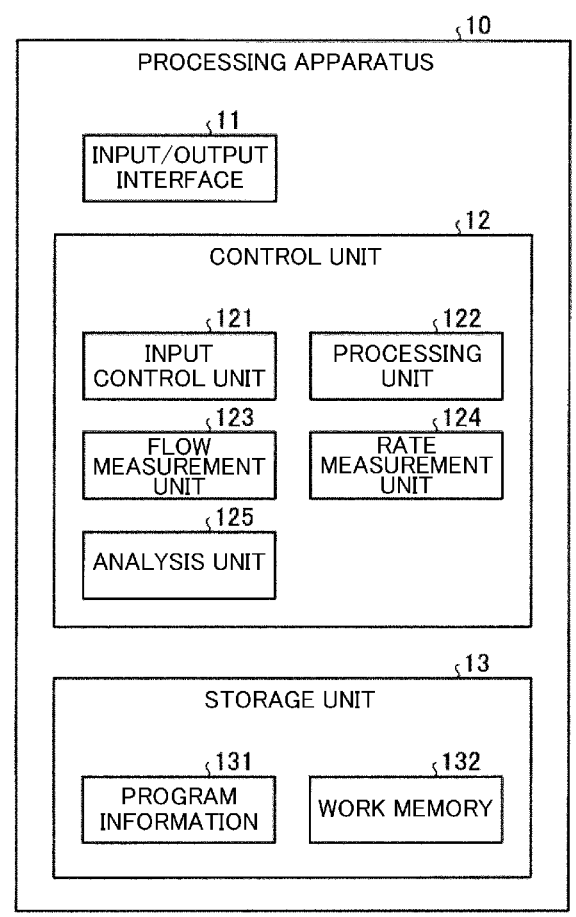
FIG. 2 is a diagram showing an example of the configuration of a processing apparatus according to the first embodiment.

The following describes the configuration of the processing apparatus according to the first embodiment with reference to FIG. 2. FIG. 2 is a diagram showing an example of the configuration of the processing apparatus according to the first embodiment. As shown in FIG. 2, the processing apparatus 10 includes an input/output interface 11, a control unit 12, and a storage unit 13.

The input/output interface 11 is an interface for the input and output of data. For example, the input/output interface 11 is an NIC (Network Interface Card). Also, the input/output interface 11 may be an input apparatus such as a mouse or a keyboard.

The control unit 12 performs overall control of the processing apparatus 10. For example, the control unit 12 is an electronic circuit such as a CPU (Central Processing Unit) or an MPU (Micro Processing Unit), or is an integrated circuit such as an ASIC (Application Specific Integrated Circuit) or an FPGA (Field Programmable Gate Array). The control unit 12 includes an internal memory for storing control data and programs that define various types of processing procedures, and executes various types of processing with use of the internal memory. The control unit 12 executes various types of programs. The control unit 12 includes the input control unit 121, the processing unit 122, a flow measurement unit 123, the rate measurement unit 124, and an analysis unit 125, for example.

The input control unit 121 controls the input of input data to the processing unit 122 in accordance with an input control policy. The input control policy is calculated by the calculation apparatus 20. Based on a measurement result obtained by the later-described rate measurement unit 124, the calculation apparatus 20 calculates an input control policy such that a condition set in advance for a corresponding type of input data is satisfied and the output data generation rate is below the transmission rate of the band. This is because if the generation rate exceeds the transmission rate of the band for synchronization, the output of unsynchronized data continues to increase, and synchronization cannot be completed.

The processing unit 122 processes received input data, and outputs output data that is to be transferred to the synchronization target apparatus using a predetermined band. The input data may be data packets, or may be predetermined signals or messages exchanged between apparatuses via a layer lower than the layer in which data packets are transmitted and received, or via a higher layer such as HTTP (Hypertext Transfer Protocol) or MQTT (Message Queuing Telemetry Transport). In the present embodiment, the input data is data packets. Also, data packets will sometimes simply be called packets in the following description.

A configuration equivalent to the processing unit 122 is reproduced in the synchronization target apparatus. For this reason, the processing unit 122 can also be called a migration target application, migration target software, or the like.

The flow measurement unit 123 measures the rate at which input data is input to the processing unit 122. For example, the flow measurement unit 123 measures the bit rate, the number of packets per unit of time, or the like as the input data rate.

The rate measurement unit 124 measures the generation rate of output data that is to be output by the processing unit 122. For example, the rate measurement unit 124 measures the amount of increase per unit time in the memory page for the output of the processing unit 122 as the generation rate.

The analysis unit 125 calculates the generation rate for each of various types of input data based on the measurement result obtained by the flow measurement unit 123 and the measurement result obtained by the rate measurement unit 124. For example, if the input data is packets, the type is "flow". In other words, the analysis unit 125 measures the generation rate of output data output from the processing unit 122 for each flow. The result of the analysis performed by the analysis unit 125 based on the measurement results is passed to the calculation apparatus 20.

The storage unit 13 is a storage apparatus such as an HDD (Hard Disk Drive), an SSD (Solid State Drive), or an optical disk. Note that the storage unit 13 may be a data-rewritable semiconductor memory such as a RAM (Random Access Memory), a flash memory, or an NVSRAM (Non Volatile Static Random Access Memory).

The storage unit 13 stores program information 131 that includes an OS (Operating System) and various types of programs executed by the processing apparatus 10, as well as various types of information used in program execution. The storage unit 13 also has a work memory 132.

Output data that is to be output from the processing unit 122 is written to the work memory 132. Also, when synchronization is performed, the data for configuring the processing unit 122 in the program information 131 and the output data written to the work memory 132 are transferred to the synchronization target apparatus.

Figure 3:
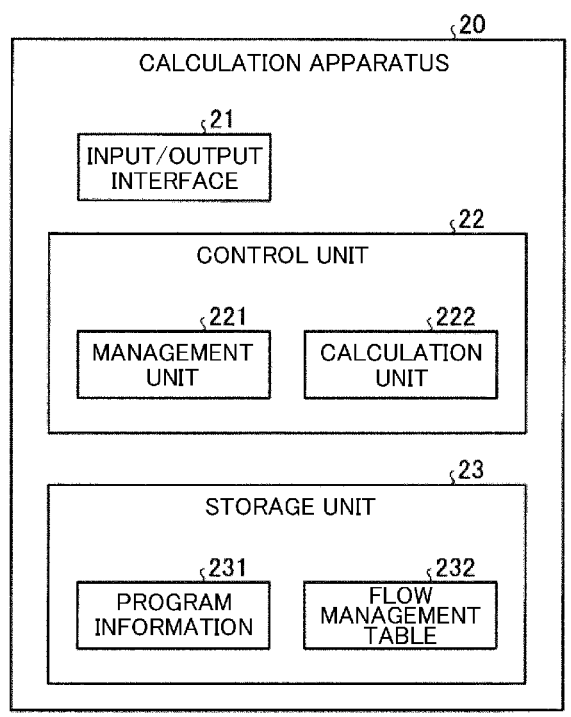
FIG. 3 is a diagram showing an example of the configuration of a calculation apparatus according to the first embodiment.

The following describes the configuration of the calculation apparatus of the first embodiment with reference to FIG. 3. FIG. 3 is a diagram showing an example of the configuration of the calculation apparatus according to the first embodiment. As shown in FIG. 3, the calculation apparatus 20 includes an input/output interface 21, a control unit 22, and a storage unit 23.

The input/output interface 21 is an interface for the input and output of data. For example, the input/output interface 21 is an NIC. Also, the input/output interface 21 may be an input apparatus such as a mouse or a keyboard. For example, the calculation apparatus 20 can use the input/output interface 21 to exchange data with the processing apparatus 10.

The control unit 22 performs overall control of the calculation apparatus 20. For example, the control unit 22 is an electronic circuit such as a CPU or an MPU, or is an integrated circuit such as an ASIC or an FPGA. The control unit 22 includes an internal memory for storing control data and programs that define various types of processing procedures, and executes various types of processing with use of the internal memory. The control unit 22 executes various types of programs. The control unit 22 includes a management unit 221 and a calculation unit 222, for example.

The management unit 221 manages a later-described flow management table 232. Specifically, the management unit 221 performs registration, deletion, updating, and the like on records in the flow management table 232 automatically or in accordance with a user operation.

The calculation unit 222 calculates an input control policy based on the generation rate received from the processing apparatus 10 and the information in the flow management table 232. The calculation unit 222 transmits the calculated input control policy to the processing apparatus 10.

The storage unit 23 is a storage apparatus such as an HDD, an SSD, or an optical disk. Note that the storage unit 23 may be a data-rewritable semiconductor memory such as a RAM, a flash memory, or an NVSRAM.

The storage unit 23 stores program information 231 that includes an OS and various types of programs executed by the calculation apparatus 20, as well as various types of information used in program execution. The storage unit 23 also stores the flow management table 232.

The following describes the flow management table with reference to FIG. 4. FIG. 4 is a diagram showing an example of the flow management table. As shown in FIG. 4, information regarding input control policies is defined for each flow in the flow management table 232. Here, a "flow" is one example of a type of input data. Each flow is a set of packets that have the same transmission source IP address, transmission source port, destination IP address, destination port, and the like.

As shown in FIG. 4, the information related to input control policies also includes a priority level, a drop rate, a transmission band, and the like. For example, the priority level is "high", "medium", or "low", and is determined in advance according to the real-time performance required by the related service, for example. The drop rate and the transmission band are information necessary when executing various methods for later-described input control.

For example, in FIG. 4, the flow whose transmission source IP address is "192.0.2.11", whose transmission source port is "8080", and whose transmission source IP address is "192.0.2.21" has a priority level of "high". As another example, the flow whose transmission source IP address is "192.0.2.13" has a priority level of "low", a drop rate of "0.4", and a transmission band of "1". Note that the drop rate and the transmission band are examples of conditions that are determined in advance for each type of input data.

Figure 5:
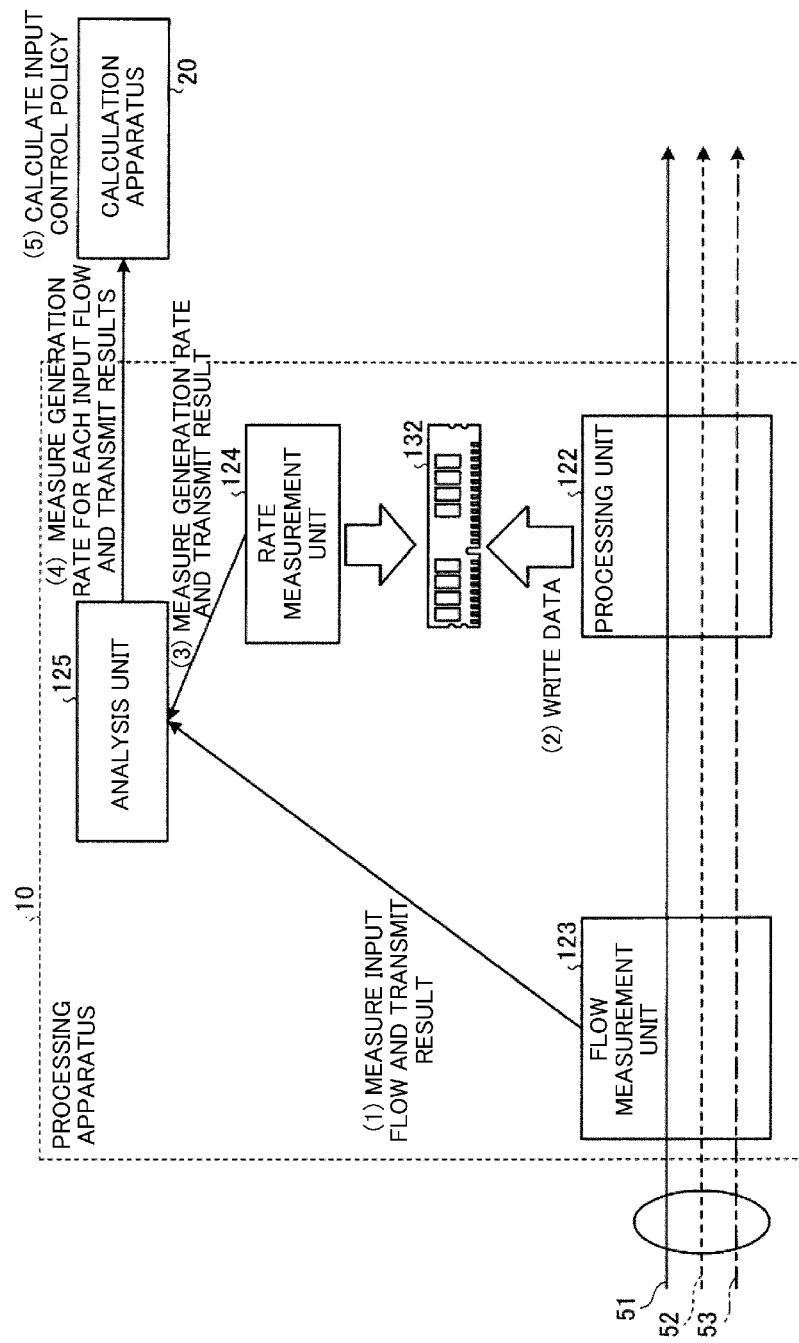
FIG. 5 is a diagram for describing an overall flow of processing performed by the software migration system.

The following describes the overall flow of processing performed by the software migration system 1 with reference to FIG. 5. FIG. 5 is a diagram for describing the overall flow of processing performed by the software migration system. As shown in FIG. 5, the processing apparatus 10 receives a flow 51, a flow 52, and a flow 53. Here, the flow 51 has a priority level of "low". The flow 52 has a priority level of "medium". The flow 53 has a priority level of "high".

As shown by (1) in FIG. 5, the flow measurement unit 123 measures the traffic rate of the received flow, and transmits the measurement result to the analysis unit 125. As shown by (2) in FIG. 5, the processing unit 122 performs processing using the received flow, and writes resulting output data to the work memory 132.

As shown by (3) in FIG. 5, the rate measurement unit 124 references the work memory 132, measures the generation rate of the output data, and transmits the measurement result to the analysis unit 125. As shown by (4) in FIG. 5, the analysis unit 125 calculates a generation rate for each received flow, and transmits the calculation results to the calculation apparatus 20.

As shown in (5) of FIG. 5, the calculation apparatus 20 calculates input control policies based on the transmitted generation rates. The calculation apparatus 20 then transmits the input control policies to the processing apparatus 10.

Figure 6:
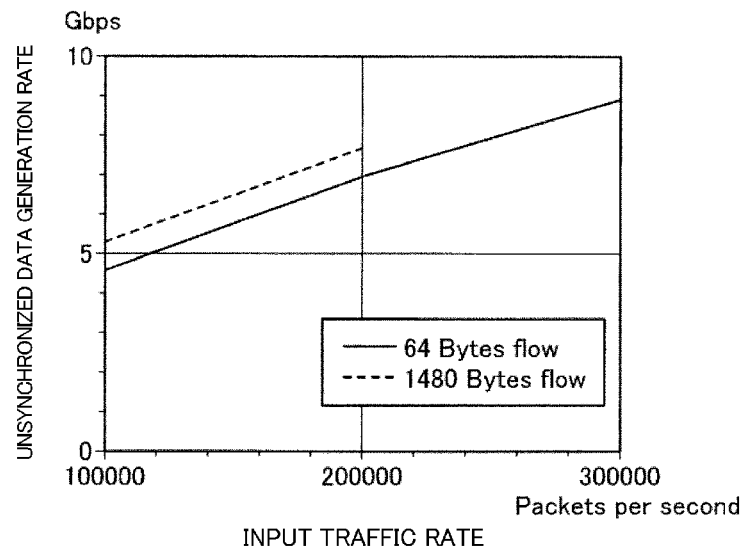
FIG. 6 is a diagram for describing the correlation between input rate and generation rate.

For example, the analysis unit 125 calculates the correlation between the input rate, which is the traffic rate of input data, and the output data generation rate. FIG. 6 is a diagram for describing the correlation between input rate and generation rate. As shown in FIG. 6, in the case of "64 bytes flow", the flow measurement unit 123 determines that the input rate is in the range of 100,000 pps (packets per second) to 200,000 pps. The rate measurement unit 124 then calculates the generation rate when the input rate is in the range of 100,000 pps to 200,000 pps.

At this time, the analysis unit 125 calculates the correlation between the input rate and the generation rate. Based on the correlation calculated by the analysis unit 125, the calculation apparatus 20 can estimate the generation rate in the case where the input rate is not in the range of 100,000 pps (packets per second) to 200,000 pps. The calculation apparatus 20 may calculate an input control policy based on such an estimated generation rate.

Here, the input control unit 121 can perform input control using various techniques in accordance with an input control policy. For example, the input control unit 121 can lower the output data generation rate by not only controlling input to the processing unit 122, but also performing control to lower the processing speed of the processing unit 122. For example, the input control unit 121 can lower the processing speed by limiting the allocation of processing time to the processing unit 122.

The input control unit 121 also controls the input of input data to the processing unit 122 such that the transfer of output data to the synchronization target apparatus ends within a pre-set allowance time for which the processing of the processing unit 122 can be stopped. Here, the allowance time is a flow interruption time that is permitted for a high-priority flow.

The input control unit 121 also controls the input of input data to the processing unit 122 such that the output data generation rate is less than or equal to a pre-set upper limit value. The input control unit 121 performs limiting such that the generation rate at least does not exceed the synchronization bandwidth. In this case, the synchronization bandwidth is the threshold value.

The input control unit 121 can also perform a combination of control using an allowance time and control using an upper limit value for the generation rate. In other words, the input control unit 121 can perform control using an upper limit value set such that the time for which the processing unit 122 needs to be stopped for the transfer of output data is shorter than the allowance time.

Also, at this time, the input control unit 121 performs control in accordance with control content for a control target flow among the flows, based on the band, the amount of unsynchronized output data, and the output data generation rate that corresponds to the input data flow. For example, even in the case of a low-priority flow, it is possible for the input control unit 121 to not perform input control on the flow if there is a sufficient amount of bandwidth or if the amount of unsynchronized output data is zero. Also, in the case of a middle-priority flow, the input control unit 121 may determine whether or not to perform control in accordance with the amount of unsynchronized output data.

The input control unit 121 realizes input control through priority control and bandwidth control or the like. Priority control is a method in which priority levels are given to flows, and queue-based control is performed to prioritize the transmission of packets in a high-priority flow. Priority control is one example of scheduling. Examples of priority control including weighted fair queuing and weighted round robin. Also, bandwidth control is a method in which a transmission allowance bandwidth is provided for each flow, and packets in a flow are dropped (policing) or the output timing of packets in flow are changed (shaping) for example in order to prevent the allowance bandwidth from being exceeded. Examples of bandwidth control including random drop, leaky bucket, and token bucket.

In the present embodiment, based on the correlation between the rate of traffic that includes input packets and the output data generation rate, the input control unit 121 controls the input of input data to the processing unit 122 using at least one of scheduling, dropping (policing), and shaping.

Specifically, the input control unit 121 performs input control through a combination of priority control and bandwidth control with respect to either the bit rate or the number of packets per unit time. For example, the input control unit 121 performs a combination of priority control and either policing or shaping.

Figure 7:
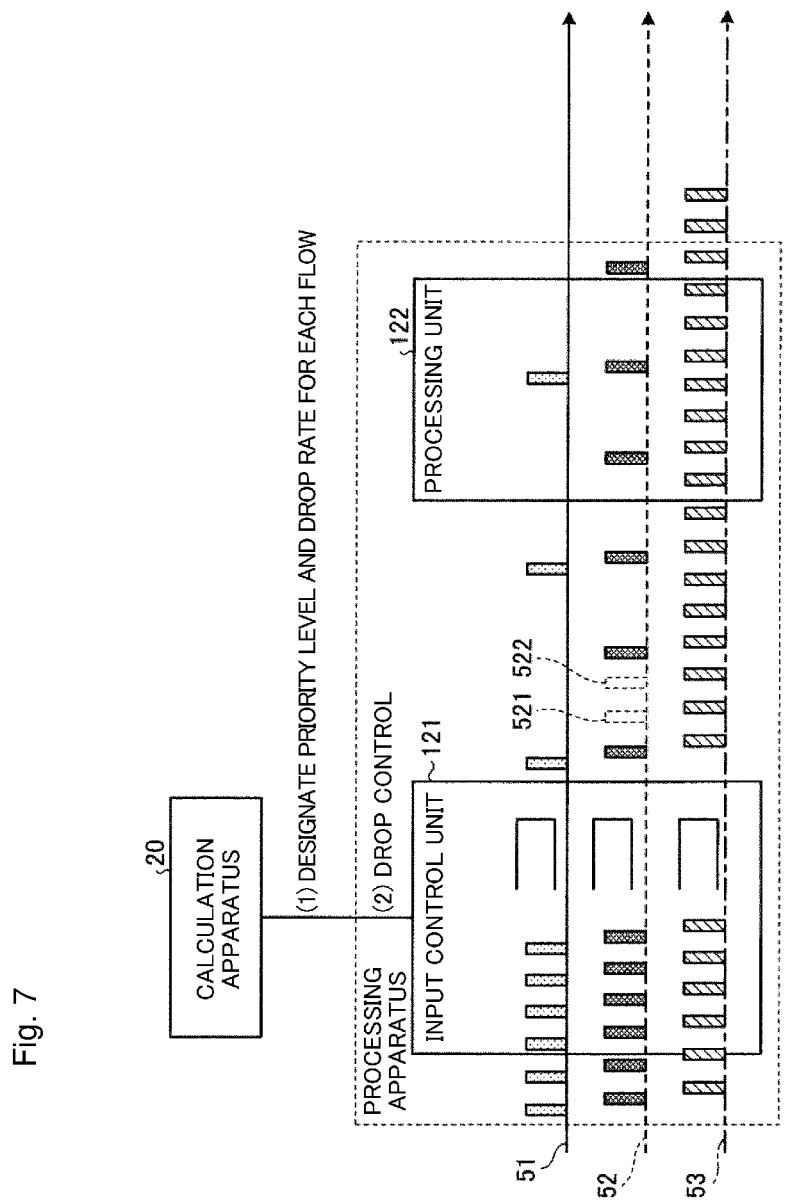
FIG. 7 is a diagram for describing policing.

The following describes policing with reference to FIG. 7. As shown in (1) of FIG. 7, the calculation apparatus 20 gives an instruction to the processing apparatus 10 regarding a priority level and a drop rate for each flow. The calculation apparatus 20 can determine the priority level and the drop rate for each flow by referencing the flow management table 232.

Similarly to the case in FIG. 5, the flow 51 has a priority level of "low". The flow 52 has a priority level of "medium". The flow 53 has a priority level of "high". In this case, for example, the input rate ratio for the flow 51, the flow 52, and the flow 53 is 1:2:3, and the upper limit value of the generation rate is 300,000 pps, and therefore the calculation apparatus 20 calculates drop rates such that packets in the flow 53 are not dropped, and transmits the drop rates to the processing apparatus 10.

As shown in (2) of FIG. 7, the processing apparatus 10 registers the drop rates for each flow, transmits packets in the flow 53 with the highest priority, and transmits packets in the flow 51 and the flow 52 with a transmission schedule that corresponds to priority level-based weighting.

Accordingly, packets that were supposed to be input at positions indicated by blanks 521 and 522 in FIG. 7 are dropped by the input control unit 121, for example. This therefore reduces the amount of output data that is output by the processing unit 122 in the processing that receives the flow 53, thus reducing the generation rate. However, the flow with the priority level of "low" is related to a service that does not require real-time performance, and thus the negative effect on the service is suppressed.

Figure 8:
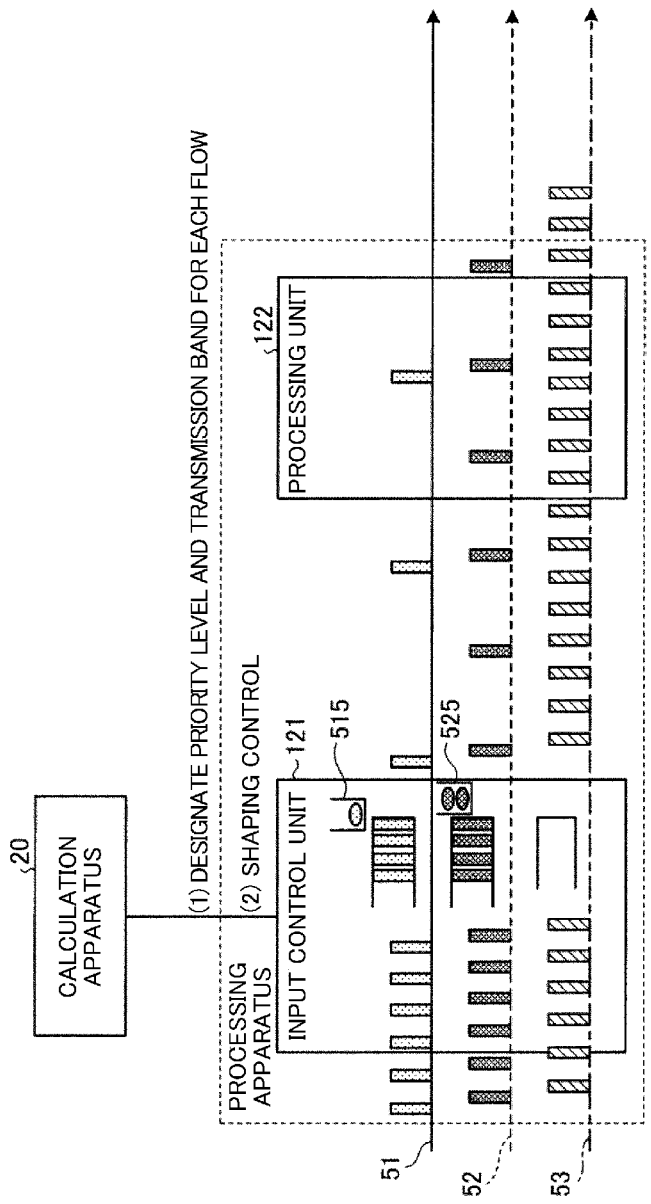
FIG. 8 is a diagram for describing shaping.

The following describes shaping with reference to FIG. 8. As shown in (1) of FIG. 8, the calculation apparatus 20 gives an instruction to the processing apparatus 10 regarding a priority level and a transmission band for each flow. The calculation apparatus 20 can determine the priority level and the transmission band for each flow by referencing the flow management table 232.

Similarly to the case in FIG. 5, the flow 51 has a priority level of "low". The flow 52 has a priority level of "medium". The flow 53 has a priority level of "high". In this case, for example, the input rate ratio for the flow 51 and the flow 52 is 1:2, and the upper limit value of the generation rate is 300,000 pps, and therefore the calculation apparatus 20 calculates transmission bands such that packets in the flow 53 are not dropped, and transmits the transmission bands to the processing apparatus 10.

As shown in (2) of FIG. 8, the processing apparatus 10 registers the transmission bands for the flow, transmits packets in the flow 53 with the highest priority, and transmits packets in the flow 51 and the flow 52 with a transmission schedule that corresponds to priority level-based weighting.

At this time, for example, the input control unit 121 stores tokens in a token bucket 515 and a token bucket 525, and delays transmission for the flow 51 and the flow 52. As a result, similarly to the case in FIG. 7, this therefore reduces the amount of output data that is output by the processing unit 122 in the processing that receives the flow 53.

Processing of First Embodiment

Figure 9:
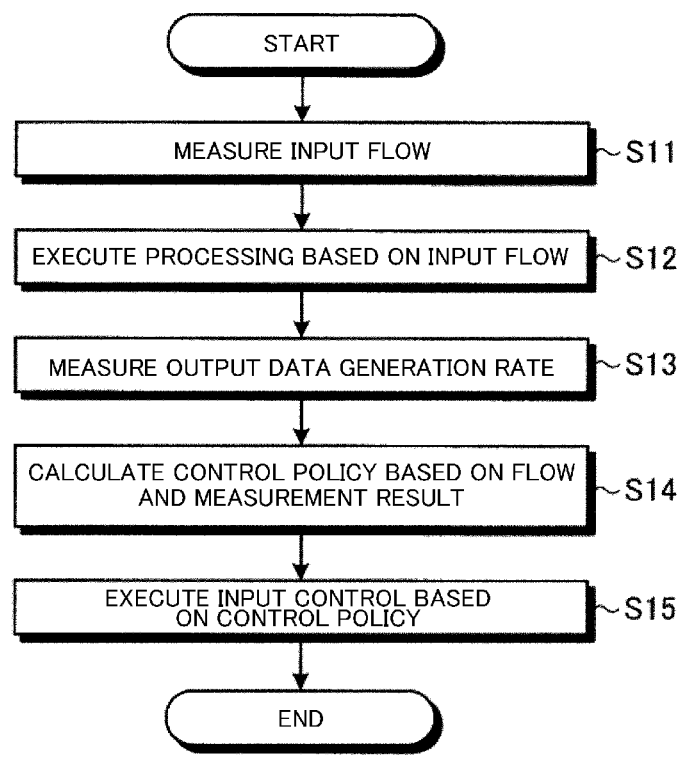
FIG. 9 is a flowchart showing an example of the flow of processing in the software migration system according to the first embodiment.

The following describes the flow of processing performed by the software migration system 1 with reference to FIG. 9. FIG. 9 is a flowchart showing the flow of processing in the software migration system according to the first embodiment. As shown in FIG. 9, first, the processing apparatus 10 performs measurement for an input flow (step S11). Next, the processing apparatus 10 executes processing based on the input flow (step S12). Here, the processing apparatus 10 outputs output data as a processing result. The processing apparatus 10 then measures the output data generation rate (step S13).

The calculation apparatus 20 then calculates a control policy based on the flow and the measurement result (step S14). The processing apparatus 10 then executes input control based on the control policy calculated by the calculation apparatus 20 (step S15).

Figure 10:
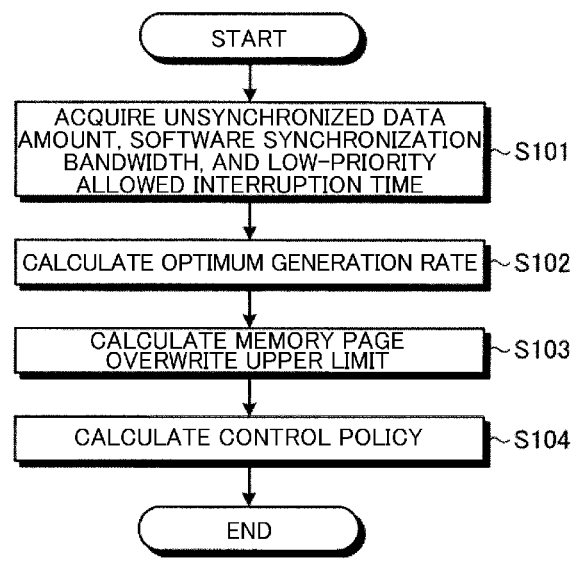
FIG. 10 is a flowchart showing a flow of calculation processing performed by a calculation processing apparatus according to the first embodiment.

The following describes the flow of calculation processing performed by the calculation apparatus 20, with reference to FIG. 10. FIG. 10 is a flowchart showing the flow of calculation processing performed by the calculation processing apparatus according to the first embodiment. As shown in FIG. 10, the calculation apparatus 20 acquires an unsynchronized data amount, a software synchronization bandwidth, and a low-priority allowed interruption time (step S101).

Because the unsynchronized data amount is information that changes with the elapse of time, the calculation apparatus 20 may acquire the unsynchronized data amount from the processing apparatus 10 at a certain time interval. Because the software synchronization bandwidth and the low-priority allowed interruption time do not change with the elapse of time, the calculation apparatus 20 may acquire the software synchronization bandwidth and the low-priority allowed interruption time in advance.

Next, the calculation apparatus 20 calculates an optimum generation rate (step S102). The calculation apparatus 20 then calculates a memory page overwrite upper limit based on the optimum generation rate (step S103). The calculation apparatus 20 then calculates a control policy based on the overwrite upper limit (step S104). The optimum generation rate is a generation rate at which the time for which the processing unit 122 needs to be stopped for the transfer of output data does not exceed the allowance time.

Effects of First Embodiment

As described above, the processing apparatus 10 of this embodiment processes received input data, and outputs output data that is to be transferred to the synchronization target apparatus using a predetermined band. Also, the processing apparatus 10 measures the generation rate of output data that is to be output by the processing unit 122. Based on the measurement result, the processing apparatus 10 controls the input of input data such that a condition set in advance for a corresponding type of input data is satisfied and the output data generation rate is below the transmission rate of the band. In this way, the processing apparatus 10 can perform input control based on a condition (e.g., priority level) that corresponds to the type of input data (e.g., a packet flow). For example, the priority level can be set according to the real-time performance required by the corresponding service, and therefore according to this embodiment it possible to reduce the negative effect on a service caused by packet loss. Particularly in the case where the input data is packets, it is possible to set the flow interruption time individually for each flow, and the minimum value of the flow interruption time can be set as designated.

The input control unit 121 also lowers the output data generation rate by performing control to lower the processing speed of the processing unit 122. For this reason, according to this embodiment, the generation rate can be lowered by both input control and processing speed control.

The processing apparatus 10 processes packets received as input data. Based on the correlation between the rate of traffic that includes input packets and the output data generation rate, the processing apparatus 10 controls the input of input data using at least one of scheduling, dropping, and shaping. For this reason, according to this embodiment, it is possible to perform input control using a technique for controlling packet transmission.

The processing apparatus 10 controls the input of input data such that the transfer of output data to the synchronization target apparatus ends within a pre-set allowance time for which the processing of the processing unit 122 can be stopped. For this reason, according to this embodiment, it is possible to prevent the case where output data synchronization does not end on time and exceeds the allowance time.

The processing apparatus 10 also controls the input of input data to the processing unit 122 such that the output data generation rate is less than or equal to a pre-set upper limit value. For this reason, according to this embodiment, input control can be easily realized by setting the upper limit value.

The processing apparatus 10 performs control using an upper limit value set such that the time for which the processing unit 122 needs to be stopped for the transfer of output data is shorter than the allowance time. Also, the processing apparatus 10 performs control in accordance with control content for a control target flow among the flows, based on the band, the amount of unsynchronized output data, and the output data generation rate that corresponds to the input data flow. For this reason, according to this embodiment, by setting the upper limit value such that the flow interruption time does not exceed the allowance time, it is possible to suppress input control to the minimum required amount.

Second Embodiment

The following describes a second embodiment. Note that the basic configuration of the processing apparatus 10 of the second embodiment is similar to the configuration of the processing apparatus 10 of the first embodiment. Hereinafter, descriptions will not be given for configurations of the processing apparatus 10 of the second embodiment that are similar to configuration of the processing apparatus 10 of the first embodiment.

In the second embodiment, a virtual processing apparatus 30 virtually executes the processing of the processing unit 122 of the processing apparatus 10. Also, generation rate measurement is performed on the result of the processing executed by the virtual processing apparatus 30.

Figure 11:
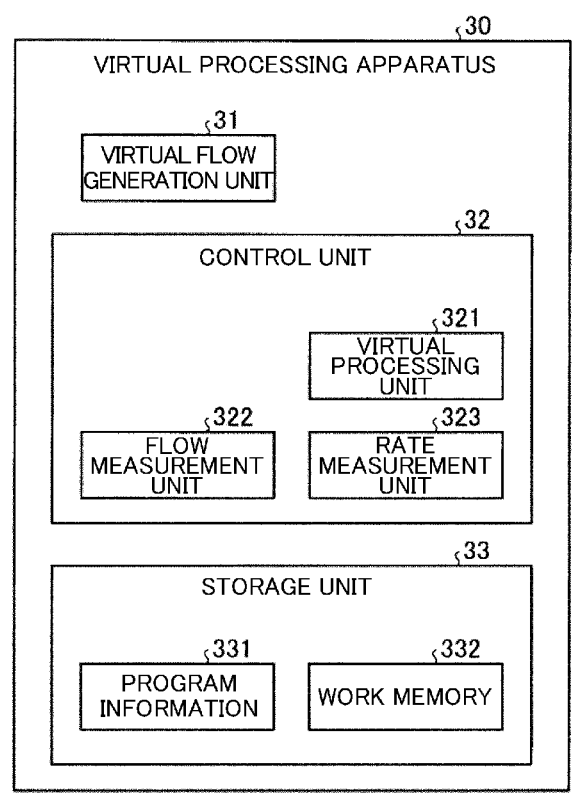
FIG. 11 is a diagram showing an example of the configuration of a virtual processing apparatus according to a second embodiment.

The following describes the virtual processing apparatus 30 with reference to FIG. 11. FIG. 11 is a diagram showing an example of the configuration of the virtual processing apparatus according to the second embodiment. As shown in FIG. 11, the virtual processing apparatus 30 includes a virtual flow generation unit 31, a control unit 32, and a storage unit 33.

The virtual flow generation unit 31 generates virtual input data. For example, the virtual flow generation unit 31 may generate virtual input data by copying a flow that is actually input to the processing apparatus 10. The virtual flow generation unit 31 may also generate a flow having tendencies similar to those of a flow input to the processing apparatus 10.

The control unit 32 has a virtual processing unit 321, a flow measurement unit 322, and a rate measurement unit 323. The virtual processing unit 321, the flow measurement unit 322, and the rate measurement unit 323 have the same behavior as the processing unit 122, the flow measurement unit 123, and the rate measurement unit 124 of the processing apparatus 10 of the first embodiment. However, the virtual processing unit 321 receives input data generated by the virtual flow generation unit 31.

The virtual processing unit 321 processes the input data generated by the virtual flow generation unit 31 and outputs output data. The flow measurement unit 322 measures the rate of the input data that is input to the virtual processing unit 321. The rate measurement unit 323 measures the generation rate of output data that is to be output when the virtual processing unit 321 processes the input data.

The virtual processing apparatus 30 passes the measurement results to the analysis unit 125 of the processing apparatus 10. The virtual processing apparatus 30 may include an analysis unit that has the same behavior as the analysis unit 125 of the processing apparatus 10. In this case, the virtual processing apparatus 30 passes analysis results to the calculation apparatus 20.

Also, program information 331 and a work memory 332 of the storage unit 33 have functions similar to those of the program information 131 and the work memory 132 of the processing apparatus 10.

Consider the case where a load or the like occurs in the traffic flow of the processing apparatus 10 when input data and output data measurement is performed using the method in the first embodiment. Because the processing apparatus 10 is actually used in service provision, it is desirable to prevent any measurement processing influence whenever possible. In view of this, according to the second embodiment, it is possible to obtain information on a synchronization target data generation rate for input without having an effect on the traffic flow of the processing apparatus during service provision.

Other Embodiments

The data input to the processing apparatus 10 in the first embodiment may be data generated during actual service provision, or may be data that is artificially generated with different amounts or types. Generating data artificially enables obtaining measurement information for various cases, thus making it possible to calculate input control policies that are more suitable for various situations.

Also, FIGS. 7 and 8 illustrate examples in which bandwidth control is performed with respect to the number of packets per unit time (the unit "pps"). However, the input control policy may be a combination of priority control and either bandwidth control with respect to the bit rate or bandwidth control with respect to the number of packets per unit time.

System Configuration Etc.

The figures conceptually show the functions of constituent elements of the above-described apparatuses, but such elements are not necessarily required to be physically configured as shown in the figures. In other words, concrete aspects of the distribution and integration of apparatuses are not limited to the figures, and some or all of the configurations of the apparatuses can be distributed or integrated functionally or physically in any manner in accordance with various loads, usage situations, or the like. Furthermore, all or any portion of the processing functions performed in the apparatuses can be realized by a CPU or a program analyzed/executed by the CPU, or can be realized as hardware through wired logic.

Also, some or all of the processing described as being performed automatically in the embodiments can be performed manually, and some or all of the processing described as being performed manually can be performed automatically using a known method. Alternatively, the processing procedures, control procedures, specific names, and information including various types of data and parameters illustrated in this specification and the drawings can be changed as desired unless particularly stated otherwise.

Program

As another embodiment, the processing apparatus 10 can be implemented by installing, in a desired computer, a migration program that executes the above-described migration processing as a software package or online software. For example, if an information processing apparatus is caused to execute the migration program, the information processing apparatus can function as the processing apparatus 10. The aforementioned information processing apparatus may be a desktop-type or notebook-type personal computer. Moreover, the information processing apparatus may be, for example, a mobile communication terminal such as a smartphone, a mobile phone, or a PHS (Personal Handy phone System), or may be a slate terminal such as a PDA (Personal Digital Assistant).

Figure 12:
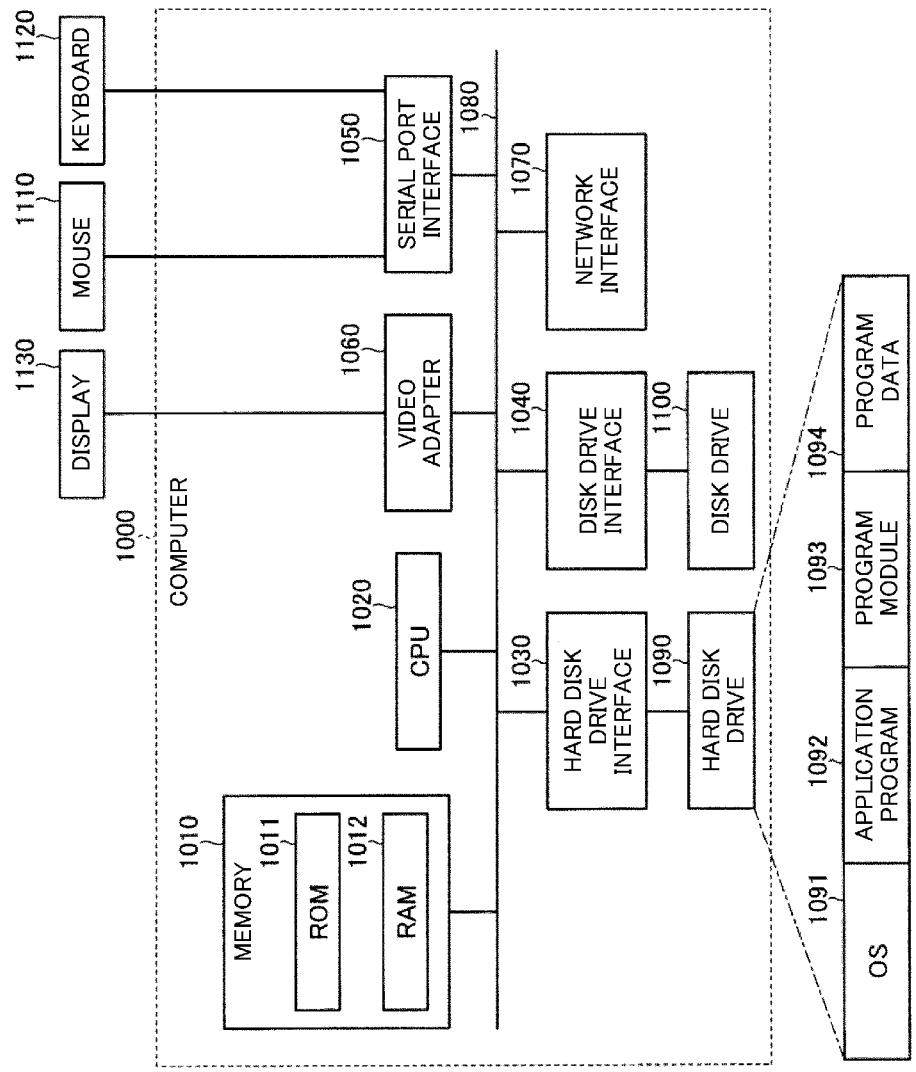
FIG. 12 is a diagram showing an example of a computer that executes a migration program.

FIG. 12 is a diagram showing an example of a computer that executes the migration program. A computer 1000 includes a memory 1010 and a CPU 1020, for example. The computer 1000 also includes a hard disk drive interface 1030, a disk drive interface 1040, a serial port interface 1050, a video adapter 1060, and a network interface 1070. These units are connected by a bus 1080.

The memory 1010 includes a ROM (Read Only Memory) 1011 and a RAM 1012. The ROM 1011 stores a boot program such as a BIOS (Basic Input Output System), for example. The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected to a mouse 1110 and a keyboard 1120, for example. The video adapter 1060 is connected to a display 1130, for example.

The hard disk drive 1090 stores an OS 1091, an application program 1092, a program module 1093, and program data 1094, for example. Specifically, a program that defines the processing of the processing apparatus 10 is implemented as the program module 1093 in which code that can be executed by a computer is described. The program module 1093 is stored in the hard disk drive 1090, for example. For example, the program module 1093 for executing processing similar to the functional configuration of the processing apparatus 10 is stored in the hard disk drive 1090. Note that the hard disk drive 1090 may be replaced with an SSD.

Also, the setting data used in the processing in the above embodiments is stored as the program data 1094 in the memory 1010, or the hard disk drive 1090, for example. The program module 1093 and the program data 1094 stored in the memory 1010 or the hard disk drive 1090 are read out to the RAM 1012 by the CPU 1020 as necessary, and the CPU 1020 executes the processing described in the above embodiments.

Note that the program module 1093 and the program data 1094 are not limited to the case of being stored in the hard disk drive 1090, and may be stored in a removable storage medium or the like and read by the CPU 1020 via the disk drive 1100 or the like. Alternatively, the program module 1093 and the program data 1094 may be stored in another computer connected via a network (LAN (Local Area Network), WAN (Wide Area Network), or the like). The program module 1093 and the program data 1094 may be read by the CPU 1020 from another computer via the network interface 1070.

REFERENCE SIGNS LIST

1 Software migration system
10 Processing apparatus
20 Calculation apparatus
30 Virtual processing apparatus
11, 21 Input/output interface
12, 22, 32 Control unit
13, 23, 33 Storage unit
31 Virtual flow generation unit
51, 52, 53 Flow
121 Input control unit
122 Processing unit
123, 322 Flow measurement unit
124, 323 Rate measurement unit
125 Analysis unit
131, 231, 331 Program information
132, 332 Work memory
221 Management unit
222 Calculation unit
232 Flow management table
321 Virtual processing unit
515, 525 Token bucket
521, 522 Blank

The invention claimed is:

1. A processing apparatus comprising:
a processing unit, implemented with one or more processors, configured to process received input data and to output output data, wherein the output data is transferrable to a synchronization target apparatus using a predetermined band;
a measurement unit, implemented with one or more processors, configured to measure a generation rate of the output data that is output by the processing unit based upon a virtual generation of the received input data; and
an input control unit, implemented with one or more processors, configured to, based on the generation rate of the output data measured by the measurement unit, control input of the received input data to the processing unit, in which a condition set in advance for a corresponding type of the received input data is satisfied and the generation rate of the output data is below a transmission rate of the predetermined band.

2. The processing apparatus according to claim 1, wherein the input control unit is configured to lower the generation rate of the output data by performing control to lower a processing speed of the processing unit.

3. The processing apparatus according to claim 1,
wherein the processing unit processes input packets as the received input data, and
wherein the input control unit controls input of the received input data to the processing unit using at least one of scheduling, dropping, and shaping, based on a correlation between a rate of traffic that includes the input packets and the generation rate of the output data.

4. The processing apparatus according to claim 1,
wherein the input control unit controls input of the received input data to the processing unit, and
wherein a transfer of the output data to the synchronization target apparatus ends within a pre-set allowance time for which processing of the processing unit can be stopped.

5. The processing apparatus according to claim 4,
wherein the input control unit is further configured to control input of the received input data to the processing unit, and
wherein the generation rate of the output data is less than or equal to a pre-set upper limit value.

6. The processing apparatus according to claim 5,
wherein the input control unit performs control using the pre-set upper limit value that has been set,
wherein a time for which the processing unit needs to be stopped for the transfer of the output data is shorter than the allowance time, and
wherein the input control unit performs control in accordance with control unsynchronized output data content for a control target flow among flows of the received input data, based on the predetermined band, an amount of unsynchronized output data, and the generation rate of the output data that corresponds to the control target flow.

7. The processing apparatus according to claim 1, wherein the virtual generation of the received input data includes a virtual processing unit having the same behavior as the processing unit.

8. A non-transitory computer readable medium storing a virtual resource allocation program including instructions that cause one or more computers to perform operations comprising:
processing received input data, and outputting output data, wherein the output data is transferrable to a synchronization target apparatus using a predetermined band;
measuring a generation rate of the output data based upon a virtual generation of the received input data; and
controlling, based on the measured generation rate of the output data, input of the input data, in which a condition set in advance for a corresponding type of the received input data is satisfied and the generation rate of the output data is below a transmission rate of the predetermined band.

9. The non-transitory computer readable medium according to claim 8, comprising operations of lowering the generation rate of the output data.

10. The non-transitory, computer readable medium according to claim 8, comprising operations of controlling input of the received input data using at least one of scheduling, dropping, and shaping, based on a correlation between a rate of traffic that includes input packets as the received input data and a generation rate of the output data.

11. The non-transitory, computer readable medium according to claim 8, comprising operations of ending transfer of the output data to the synchronization target apparatus within a pre-set allowance time for which processing of the received input data can be stopped.

12. The non-transitory, computer readable medium according to claim 11, wherein the generation rate of the output data is less than or equal to a pre-set upper limit value.

13. The non-transitory, computer readable medium according to claim 12,
wherein the controlling input of the received input data is performed using the pre-set upper limit value,
wherein a time for which processing of the received input data can be stopped for the transfer of the output data is shorter than the allowance time, and
wherein the controlling input of the received input data is performed in accordance with unsynchronized output data content for a control target flow among flows of the received input data, based on the predetermined band, an amount of unsynchronized output data, and the generation rate of the output data that corresponds to the control target flow.

14. The non-transitory, computer readable medium according to claim 8, wherein the virtual generation of the received input data includes virtual processing having the same behavior as the processing of the received input data.

* * * * *